(12) United States Patent
Hasan

(10) Patent No.: US 7,432,224 B2
(45) Date of Patent: Oct. 7, 2008

(54) IMAGING COMPOSITIONS, IMAGING METHODS AND IMAGING MEMBERS

(76) Inventor: Fariza B. Hasan, 80 Riverview Ave., Waltham, MA (US) 02453

( * ) Notice: Subject to any disclaimer, the term of this patent is extended or adjusted under 35 U.S.C. 154(b) by 251 days.

(21) Appl. No.: 10/932,202

(22) Filed: Sep. 1, 2004

(65) Prior Publication Data
US 2006/0046934 A1   Mar. 2, 2006

(51) Int. Cl.
*B41M 5/035*   (2006.01)
*B41M 5/385*   (2006.01)

(52) U.S. Cl. .................... 503/227; 156/235; 428/32.6

(58) Field of Classification Search .............. None
See application file for complete search history.

(56) References Cited

U.S. PATENT DOCUMENTS

| | | | |
|---|---|---|---|
| 5,286,288 A * | 2/1994 | Tobias et al. | 106/31.29 |
| 5,298,062 A * | 3/1994 | Davies et al. | 106/31.29 |
| 5,369,078 A * | 11/1994 | Eguchi et al. | 503/227 |
| 5,385,957 A * | 1/1995 | Tobias et al. | 523/161 |
| 5,620,508 A | 4/1997 | Yamano et al. | 106/23 A |
| 6,221,114 B1 | 4/2001 | Würthner | 8/661 |
| 6,537,410 B2 | 3/2003 | Arnost et al. | 156/235 |
| 6,801,233 B2 | 10/2004 | Bhatt et al. | 347/175 |
| 2003/0159616 A1 | 8/2003 | Wang et al. | 106/31.43 |
| 2004/0138436 A1 | 7/2004 | Schacht et al. | 534/844 |

FOREIGN PATENT DOCUMENTS

| | | |
|---|---|---|
| EP | 0 376 284 A2 | 7/1990 |
| EP | 0 376 284 A3 | 7/1990 |
| EP | 0 481 449 A2 | 4/1992 |
| EP | 0 481 449 A3 | 4/1992 |
| EP | 1 310 533 A2 | 5/2003 |
| EP | 1 310 533 A3 | 5/2003 |

\* cited by examiner

*Primary Examiner*—Bruce H Hess
(74) *Attorney, Agent, or Firm*—Woodcock Washburn LLP

(57) ABSTRACT

There are described imaging compositions which include a copper phthalocyanine dye and an aminoanthraquinone dye and thermal imaging members and ink jet inks which utilize the imaging compositions. Thermal imaging methods utilizing the thermal imaging members and ink jet imaging methods utilizing the ink jet inks are also described.

16 Claims, 2 Drawing Sheets

IMAGING COMPOSITIONS, IMAGING METHODS AND IMAGING MEMBERS

REFERENCE TO RELATED APPLICATIONS

This application is related to U.S. Pat. No. 6,537,410 the entire disclosure of which is hereby incorporated by reference herein.

FIELD OF THE INVENTION

The present invention relates generally to imaging methods, imaging compositions and imaging members and, more particularly, to such imaging methods, imaging compositions and imaging members for forming images which are resistant to ozone fading.

There has been a great deal of interest in thermal imaging methods and members, particularly for use with the reproduction of color digital images. Conventional methods for color thermal imaging such as thermal wax transfer printing and dye-diffusion thermal transfer typically involve the use of separate donor and receiver materials. The donor material typically has a colored image-forming material, or a color-forming imaging material, coated on a surface of a substrate and the image-forming material or the color-forming imaging material is transferred thermally to the receiver material. In order to make multicolor images, a donor material with successive patches of differently-colored, or different color-forming, material may be used. In the case of printers having either interchangeable cassettes or more than one thermal head, different monochrome donor ribbons are utilized and multiple color separations are made and deposited successively above one another.

Ink jet printers which are capable of the printing of color digital images have become increasingly popular. Such printers, which form an image by firing a plurality of discrete droplets of ink from one or more nozzles onto a recording sheet located adjacent the nozzles, can produce both reflection prints and transparencies.

Ozone fading of color images, including those made by any of the imaging methods discussed above, has been a disadvantage in some instances. Copper phthalocyanine dyes, widely used in imaging products, are known to have high susceptibility to ozone fading. Mixing such dyes with conventional antiozonants, which are known and used in other non-imaging industrial products, is typically not suitable for systems where the dyes are required to be in solution, due to the relatively lower solubility of these antiozonants in the aqueous or solvent systems required to manufacture the imaging members including the dyes or to prepare the ink solutions used in ink jet printing. Use of such antiozonants also increases the total loading of the solids in the image-forming layers or ink solutions without any contribution to the color formed during the imaging method.

Some of these efficient antiozonants also react with air, resulting in highly colored compounds, thus making them unsuitable for use in imaging products. For example, p-phenylenediamines are effective antiozonants but these compounds undergo severe discoloration when exposed to air or ozone.

Various attempts have been made to provide images which are more stable to fading. For example, United States Patent Application Publication No. US2003/0159616 A1 describes ink jet compositions which include a rhodamine dye and a metallized magenta dye. Nevertheless, to deal with this problem, there is ongoing in the art a continuing effort to find new imaging methods, compositions and members which can form images which are resistant to fading.

It would be desirable to be able to incorporate in imaging materials such as color image-forming layers used in thermal printing or ink solutions for use in ink jet printing, components which make the images formed more resistant to fading such as by exposure to ozone.

SUMMARY OF THE INVENTION

It is an object of the invention to provide novel imaging methods, imaging compositions and imaging members which form images having improved ozone stability.

It is another object of this invention to provide such imaging compositions which include a copper phthalocyanine dye in combination with an aminoanthraquinone dye for use in imaging methods and imaging members.

Another object is to provide thermal imaging methods and thermal imaging members which utilize the compositions of the invention.

A further object is to provide novel ink compositions for use in ink jet printing methods.

In one aspect of the invention there are provided novel color imaging compositions which include a copper phthalocyanine dye in combination with an aminoanthraquinone dye. In accordance with the invention, aminoanthraquinone dyes are used with copper phthalocyanine dyes for increasing the ozone stability of the images formed without any significant change in color of the images.

The aminoanthraquinone dyes utilized in accordance with the invention contain functional groups which contribute to antiozonant properties and also contain electron withdrawing carbonyl groups in the fused ring system, which result in a reduction in the formation of colored oxidation products, without any considerable loss of antiozonant properties.

Aminoanthraquinone dyes also contain other groups of varying electronegativities. It has been found that when an aminoanthraquinone dyes is mixed with a copper phthalocyanine dye in accordance with the invention, the ozone stability of the mixed dye system is better than that of the copper phthalocyanine dye alone. The efficiency of the added aminoanthraquinone dye as an antiozonant has been found to be significantly dependent, at least in part, upon the substituents present in the dye. Typically, electron donating substituents increase and electron withdrawing substituents decrease the antiozonant effectiveness.

In another aspect of the invention there are provided novel color thermal imaging members and thermal imaging methods which utilize the imaging members.

In another aspect of the invention there are provided ink jet imaging inks and ink jet printing methods utilizing the inks.

BRIEF DESCRIPTION OF THE DRAWINGS

For a better understanding of the invention as well as other objects and advantages and further features thereof, reference is made to the following detailed description of various preferred embodiments thereof taken in conjunction with the accompanying drawings wherein.

DESCRIPTION OF THE PREFERRED EMBODIMENTS

Figure 1:
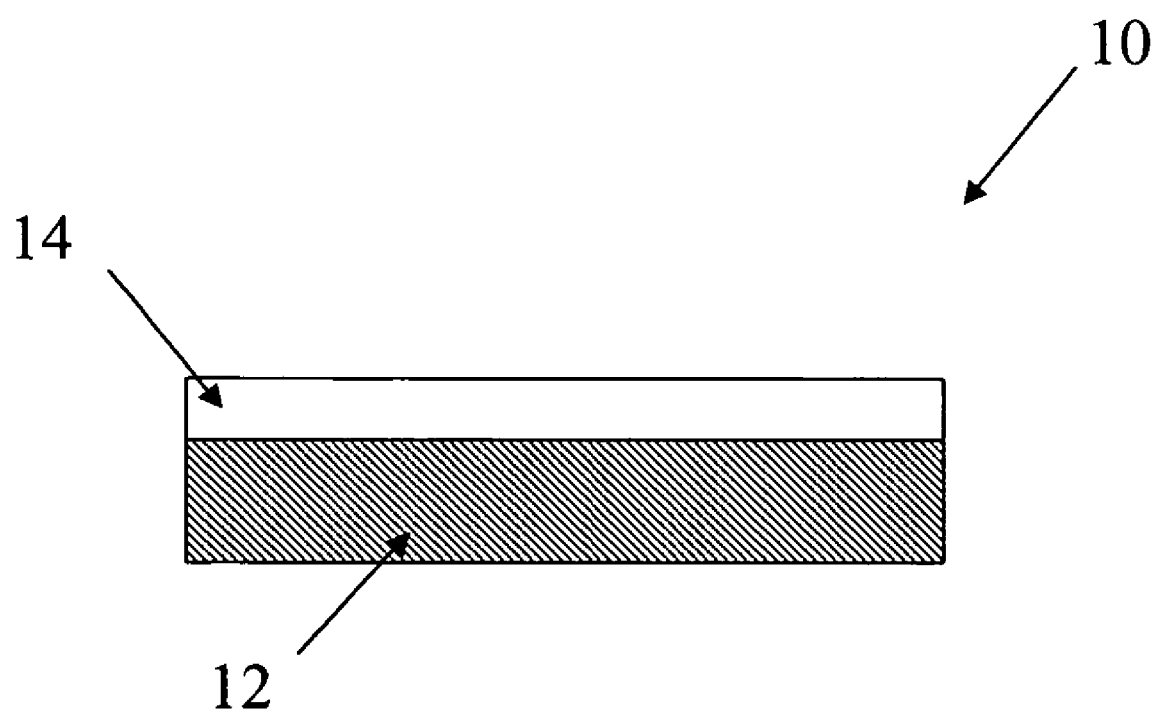
FIG. 1 is a partially schematic, side sectional view of a color-forming imaging member according to the invention.

The color-forming imaging compositions of the invention include a copper phthalocyanine dye in combination with an aminoanthraquinone dye which is represented by the formula

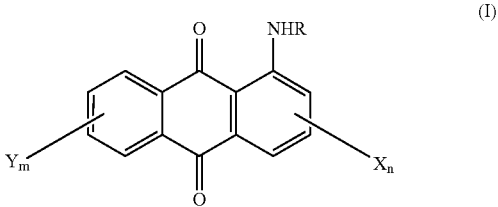

wherein
R is selected from:
  a. hydrogen;
  b. alkyl, straight-chain or branched, preferably having from 1 to 12 carbon atoms, such as methyl, ethyl, propyl and the like;
  c. hydroxyalkyl such as hydroxymethyl, hydroxypropyl and the like;
  d. aryl such as phenyl and the like; and
  e. substituted aryl such as phenyl substituted with one or more substituents such as alkyl;
X and Y are each independently selected from:
  a. hydrogen;
  b. halogen such as bromine;
  c. —OH;
  d. —NHR, where R is as previously defined; or
  e. X or Y, independently, together with two of the carbon atoms of the ring moiety to which X or Y is attached, represents the carbon, nitrogen or oxygen atoms necessary to form a 5 or 6 member carbocyclic or heterocyclic ring containing one or more carbonyl groups; and
m and n are each independently integers of from 1 to 3.

Definitions

The term "alkyl" as used herein refers to saturated straight-chain, branched-chain or cyclic hydrocarbon radicals. Examples of alkyl radicals include, but are not limited to, methyl, ethyl, propyl, isopropyl, n-butyl, tert-butyl, neopentyl, n-hexyl, cyclohexyl, n-octyl, n-decyl, n-dodecyl and n-hexadecyl radicals.

The term "hydroxyalkyl" as used herein refers to a hydroxy group attached to an alkyl group, as defined herein, including, but not limited to, hydroxymethyl, hydroxyethyl, hydroxypropyl and the like.

The terms "halo" and "halogen", as used herein, refer to an atom selected from fluorine, chlorine, bromine and iodine.

The term "aryl", as used herein, refers to a mono-, bicyclic or tricyclic carbocyclic ring system having one, two or three aromatic rings including, but not limited to, phenyl, naphthyl, anthryl, azulyl, tetrahydronaphthyl, indanyl, indenyl and the like.

The term "carbonyl" as used herein refers to a carbonyl group, attached to the parent molecular moiety through the carbon atom, this carbon atom also bearing a hydrogen atom, or in the case of a "substituted carbonyl" a substituent as described in the definition of "substituted" below.

The term "substituted" as used herein in phrases such as "substituted alkyl", "substituted alkenyl", "substituted aryl", "substituted heteroaryl", "substituted heterocycloalkyl", "substituted carbonyl", "substituted alkoxy", "substituted acyl", "substituted amino", "substituted aryloxy", and the like, refers to independent replacement of one or more of the hydrogen atoms on the substituted moiety with substituents independently selected from, but not limited to, alkyl, alkenyl, heterocycloalkyl, alkoxy, aryloxy, hydroxy, amino, alkylamino, arylamino, cyano, halo, mercapto, nitro, carbonyl, acyl, aryl and heteroaryl groups.

The term "heterocyclic", as used herein, refers to heterocycloalkyl and heteroaryl. The term "substituted heterocyclic", as used herein, refers to substituted heterocycloalkyl and substituted heteroaryl.

The term "heteroaryl," as used herein, refers to a cyclic aromatic radical having from five to ten ring atoms of which one ring atom is selected from S, O and N; zero, one or two ring atoms are additional heteroatoms independently selected from S, O and N; and the remaining ring atoms are carbon, the radical being joined to the rest of the molecule via any of the ring atoms, such as, for example, pyridinyl, pyrazinyl, pyrimidinyl, pyrrolyl, pyrazolyl, imidazolyl, thiazolyl, oxazolyl, isooxazolyl, thiadiazolyl, oxadiazolyl, thiophenyl, furanyl, quinolinyl, isoquinolinyl, and the like.

The term "substituted heteroaryl," as used herein, refers to a heteroaryl group as defined herein, substituted by independent replacement of one, or more of the hydrogen atoms thereon with substituents independently selected from substituents such as, but not limited to, alkyl, haloalkyl, alkoxy, thioalkoxy, amino, alkylamino, dialkylamino, acylamino, hydroxy, cyano, halo, mercapto, nitro, carboxaldehyde, carboxyl, alkoxycarbonyl, carboxamide, aryl, substituted aryl, heteroaryl, substituted heteroaryl, benzyl, benzyloxy, aryloxy, heteroaryloxy, $C_1$-$C_6$-alkoxy, methoxymethoxy, methoxyethoxy, amino, benzylamino, arylamino, heteroarylamino, $C_1$-$C_3$-alkylamino, thio, aryl-thio, heteroarylthio, benzyl-thio, $C_1$-$C_6$-alkyl-thio, or methylthiomethyl. Representative substituents include, but are not limited to, F, Cl, Br, I, OH, $NO_2$, CN, C(O)—$C_1$-$C_6$-alkyl, C(O)-aryl, C(O)-heteroaryl, $CO_2$-alkyl, $CO_2$-aryl, $CO_2$-heteroaryl, $CONH_2$, CONH—$C_1$-$C_6$-alkyl, CONH-aryl, CONH-heteroaryl, OC(O)—$C_1$-$C_6$-alkyl, OC(O)-aryl, OC(O)-heteroaryl, $OCO_2$-alkyl, $OCO_2$-aryl, $OCO_2$-heteroaryl, $OCONH_2$, OCONH—$C_1$-$C_6$-alkyl, OCONH-aryl, OCONH-heteroaryl, NHC(O)—$C_1$-$C_6$-alkyl, NHC(O)-aryl, NHC(O)-heteroaryl, $NHCO_2$-alkyl, $NHCO_2$-aryl, $NHCO_2$-heteroaryl, $NHCONH_2$, NHCONH—$C_1$-$C_6$-alkyl, NHCONH-aryl, NHCONH-heteroaryl, $SO_2$—$C_1$-$C_6$-alkyl, $SO_2$-aryl, $SO_2$-heteroaryl, $SO_2NH_2$, $SO_2NH$—$C_1$-$C_6$-alkyl, $SO_2NH$-aryl, $SO_2NH$-heteroaryl, $C_1$-$C_6$-alkyl, $C_3$-$C_6$-cycloalkyl, $CF_3$, $CH_2CF_3$, $CH_2Cl_2$, $CH_2OH$, $CH_2CH_2OH$, $CH_2NH_2$, $CH_2SO_2CH_3$, tetrafluorophenyl and pentafluorophenyl.

The term "heterocycloalkyl," as used herein, refers to a non-aromatic 3-, 4-, 5-, 6- or 7-membered ring or a bi- or tri-cyclic group comprising fused six-membered rings having between one and three heteroatoms independently selected from oxygen, sulfur and nitrogen, wherein (i) each 5-membered ring has 0 to 1 double bonds and each 6-membered ring has 0 to 2 double bonds, (ii) the nitrogen and sulfur heteroatoms may optionally be oxidized, (iii) the nitrogen heteroatom may optionally be quaternized, and (iv) any of the above heterocyclic rings may be fused to a benzene ring. Representative heterocycles include, but are not limited to, pyrrolidinyl, pyrazolinyl, pyrazolidinyl, imidazolinyl, imidazolidinyl, piperidinyl, piperazinyl, oxazolidinyl, isoxazolidinyl, morpholinyl, thiazolidinyl, isothiazolidinyl, and tetrahydrofuryl.

The term "substituted heterocycloalkyl", as used herein, refers to a cycloalkyl group, as defined herein, substituted by independent replacement of one or more of the hydrogen atoms therein with substituents independently selected from substituents such as, but not limited to, alkyl, haloalkyl, alkoxy, thioalkoxy, amino, alkylamino, dialkylamino, acylamino, hydroxy, cyano, halo, mercapto, nitro, carboxaldehyde, carboxyl, alkoxycarbonyl, carboxamide, aryl, substituted aryl, heteroaryl, substituted heteroaryl, benzyl, benzyloxy, aryloxy, heteroaryloxy, $C_1$-$C_6$-alkoxy, methoxymethoxy, methoxyethoxy, amino, benzylamino, arylamino, heteroarylamino, $C_1$-$C_3$-alkylamino, thio, aryl-thio, heteroarylthio, benzyl-thio, $C_1$-$C_6$-alkyl-thio, or methylthiomethyl. Representative substituents include, but are not limited to, F, Cl, Br, I, OH, $NO_2$, CN, C(O)—$C_1$-$C_6$-alkyl, C(O)-aryl, C(O)-heteroaryl, $CO_2$-alkyl, $CO_2$-aryl, $CO_2$-heteroaryl, $CONH_2$, CONH—$C_1$-$C_6$-alkyl, CONH-aryl, CONH-heteroaryl, OC(O)—$C_1$-$C_6$-alkyl, OC(O)-aryl, OC(O)-heteroaryl, $OCO_2$-alkyl, $OCO_2$-aryl, $OCO_2$-heteroaryl, $OCONH_2$, OCONH—$C_1$-$C_6$-alkyl, OCONH-aryl, OCONH-heteroaryl, NHC(O)—$C_1$-$C_6$-alkyl, NHC(O)-aryl, NHC(O)-heteroaryl, $NHCO_2$-alkyl, $NHCO_2$-aryl, $NHCO_2$-heteroaryl, $NHCONH_2$, NHCONH—$C_1$-$C_6$-alkyl, NHCONH-aryl, NHCONH-heteroaryl, $SO_2$—$C_1$-$C_6$-alkyl, $SO_2$-aryl, $SO_2$-heteroaryl, $SO_2NH_2$, $SO_2$NH—$C_1$-$C_6$-alkyl, $SO_2$NH-aryl, $SO_2$NH-heteroaryl, $C_1$-$C_6$-alkyl, $C_3$-$C_6$-cycloalkyl, $CF_3$, $CH_2CF_3$, $CH_2Cl_2$, $CH_2OH$, $CH_2CH_2OH$, $CH_2NH_2$, $CH_2SO_2CH_3$,. tetrafluorophenyl and pentafluorophenyl.

The term "alkoxy", as used herein, refers to a substituted or unsubstituted alkyl, alkenyl or heterocycloalkyl group, as previously defined, attached to the parent molecular moiety through an oxygen atom. Examples of alkoxy radicals include, but are not limited to, methoxy, ethoxy, propoxy, isopropoxy, n-butoxy, tert-butoxy, neopentoxy and n-hexoxy.

The imaging compositions of the invention include at least one copper phthalocyanine dye and at least one aminoanthraquinone dye of formula I. Preferred aminoanthraquinone dyes for use according to the invention include Disperse Blue 3, Disperse Blue 7, Disperse Blue 14, Disperse blue 56, Disperse Blue 60, Solvent Blue 14, Solvent Blue 35, Solvent Blue 59, Solvent Blue 104, Solvent Green 3, Solvent Green 28, and Disperse Violet 1.

Aminoanthraquinone dyes typically absorb in various regions of the spectrum and typically exhibit low extinction compared to dyes which are incorporated in imaging products. It is preferred to utilize aminoanthraquinone dyes of formula I which absorb in regions close to the copper phthalocyanine dye(s) so the color of the resultant images will not be shifted to any noticeable extent.

Copper phthalocyanine dyes have a core structure represented by the formula

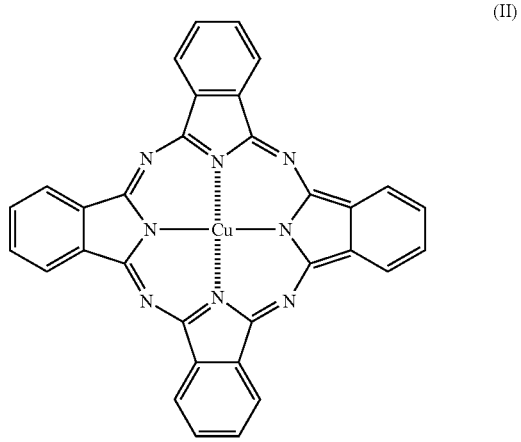

(II)

CAS # 3147-14-8

The copper phthalocyanine dyes which are useful according to the invention include a moiety of formula II and may have a substituent or substituents on one or more of the phenyl rings.

Any suitable copper phthalocyanine dye can be used in the imaging compositions of the invention including Solvent Blue 44, Solvent Blue 67 and Solvent Blue 70. Preferred copper phthalocyanine dyes include those which have good solubility in common organic solvents, the desired absorption spectra and high extinction coefficients.

Referring now to FIG. 1 there is seen a color-forming thermal imaging member according to the invention. Imaging member 10 includes a substrate 12 carrying color image-forming material layer 14 and is preferred for use in thermal transfer printing methods such as thermal wax transfer printing and dye-diffusion thermal transfer printing which typically involve the use of separate donor and receiver materials.

Substrate 12 may be of any suitable material for use in thermal imaging members, such as polymeric materials, and may be transparent or reflective, and also microporous.

Image-forming material layer 14 may include one or more aminoanthraquinone dyes of formula I and one or more copper phthalocyanine dyes. Typically, image-forming layer 14 includes from about 1.0 to about 2.0 molar equivalents of aminoanthraquinone dye(s) to about one molar equivalent of copper phthalocyanine dye(s). Preferably, layer 14 includes about one molar equivalent of each of the respective types of dyes.

Copper phthalocyanine dyes are typically cyan and absorb in the green to violet region of the spectrum, although some are infrared dyes and absorb at wavelengths greater than 700 nm.

The preferred aminoanthraquinone dyes for use according to the invention, are cyan dyes which absorb in the same spectral range, i.e., green to violet as the preferred copper phthalocyanine dyes. However, the spectral absorption of these preferred aminoanthraquinone dyes is typically much lower than that of the copper phthalocyanine dyes. Thus, the spectra of combinations of the preferred aminoanthraquinone dyes and copper phthalocyanine dyes are very close to those of the copper phthalocyanine dyes.

Image-forming layer 14 may be of any thickness. The thickness of the layer in any particular instance is primarily dependent upon the particular application. Layer 14 is typically from about 0.5 μm to about 4.0 μm in thickness, preferably about 2 μm. Image-forming layer 14 may comprise dispersions of solid materials, encapsulated liquid, amorphous or solid materials or solutions of active materials in polymeric binders, or any combinations of the above.

Particularly preferred thermal transfer imaging members according to the invention are those of the type described in U.S. Pat. No. 6,537,410 B2 which is hereby incorporated by reference herein in its entirety. Such thermal imaging members, or donor elements, comprise a substrate bearing a layer of thermal transfer material comprising a dye-containing, amorphous (non-crystalline) phase that includes at least one dye and wherein the dye or dyes present in the amorphous phase form a continuous film. Optionally, and preferably, the thermal transfer material layer includes at least one thermal solvent such that at least part of the thermal solvent material is incorporated into the dye-containing phase and another part of the thermal solvent forms a second, crystalline, phase separate from the dye-containing phase. The crystalline thermal solvent in the thermal transfer material layer melts and dissolves or liquefies the dye-containing phase thereby permitting dissolution or liquefaction to occur at a temperature lower than that at which such dissolution or liquefaction to occur in the absence of the crystalline thermal solvent.

The thermal transfer material layer is characterized in that it is a solid transparent or translucent film which does not undergo any detectable flow at room temperature and the film is formed by the dye(s) in the amorphous phase.

The dyes which are used in the thermal transfer material layers of such thermal transfer imaging members can be those which form solids which are themselves amorphous, that is to say, solids which lack the long-range ordered structure characteristic of crystalline solids. Amorphous solids formed from low molecular weight organic compounds have been described in the art. Such films can be stabilized with respect to the corresponding crystalline phase either thermodynamically (for example, by using in the glass phase a mixture of two or more chemically similar molecules) or kinetically, by means of a network of weak bonds (for example, hydrogen bonds) between the individual molecules.

In the two phase embodiment, the thermal transfer material layer comprises a mixture of the dye-containing phase and at least one "thermal solvent", which is a crystalline material. At least a portion of the thermal solvent present in the thermal transfer material layer forms a phase separate from the dye-containing phase. The thermal solvent is believed to be equilibrated between the amorphous form present in the dye-containing amorphous phase and the crystalline form present in the other phase.

The amount of thermal solvent which can be present in the dye-containing amorphous phase is thought to be limited by the Tg of the amorphous phase which is preferably at least about 50° C. and particularly preferably about 60° C. In this manner blocking, i.e., sticking together, of the thermal transfer donor sheets can be avoided even under high temperature storage conditions. Preferably, there should be no first order phase change for the entire thermal transfer material layer, i.e., there should be no melting of the layer, below about 50° C.

The crystalline thermal solvent melts during the heating of the donor sheet and dissolves or liquefies the dye-containing phase, thereby permitting the transfer of portions of the transfer layer to the receiving sheet to occur at a temperature lower than such transfer would occur in the absence of the crystalline thermal solvent. The mixture of dye(s) and thermal solvent melts at a temperature which is approximately the same as that of the crystalline thermal solvent itself (and substantially below the melting point of the dye in the powder (crystalline) form)

In some preferred embodiments, the thermal solvent selected for the transfer layer is a good solvent for the dye(s) of the dye-containing phase. In these embodiments, the dot size of the transferred imaging material may be varied by use of a thermal printing head optimized for variable dot printing.

The two phase embodiment allows dye transfer to be effected at temperatures substantially lower than those achievable when the transfer layer contains only the same dye-containing phase, and hence with lower energy inputs per unit area imaged. The thermal solvent used can be any fusible material which melts above ambient temperature and which dissolves or liquefies the dye-containing phase to form a mixture which transfers at a lower temperature than that of the dye-containing phase alone. The ratio of thermal solvent to dye may range from about 1:3 by weight to about 3:1. A preferred ratio is about 2:1. Thus, the two phase embodiment can provide a major reduction of imaging temperature while maintaining a thin donor layer. The thermal solvent may separate into a second phase as the mixture cools after imaging, and preferably the thermal solvent should not form such large crystals that it adversely affects the quality of the resulting image. The thermal solvent preferably has a melting point sufficiently above room temperature such that the donor layer is not tacky at room temperature, and does not melt at temperatures likely to be encountered during transportation and storage of the donor sheet prior to imaging.

The crystalline thermal solvents used in the two-phase embodiments typically have a melting point in the range of from about 60° C. to about 120° C. and preferably in the range of from about 85° C. to about 100° C. It is particularly preferred that the thermal solvent have a melting point of about 90° C.

When the imaging compositions of the invention are used in a image-forming layer of a thermal imaging member of the type described in U.S. Pat. No. 6,537,410 B2, the image-forming layer is as thin as possible consistent with good imaging characteristics, especially the maximum optical density of the image which typically should be at least about 1.5. Therefore, in this type of a thermal imaging member the image-forming layer typically has a thickness not greater than about 1.5 μm and preferably not greater than 11.0 μm.

Where the thermal image-forming members of the invention are used in a thermal transfer imaging method, any suitable image-receiving member may be used. Preferred image-receiving members are described in U.S. Pat. No. 6,761,788 B1 which is incorporated by reference herein in its entirety.

When used in thermal transfer imaging methods, the thermal image-forming members of the invention may include a substrate carrying a layer of a copper phthalocyanine dye and an aminoanthraquinone dye of formula I. The thermal image-forming members of the invention, as illustrated in FIG. 1, may be used individually in a thermal monochrome imaging method or used in multicolor thermal imaging methods in conjunction with one or more different thermal image-forming members of different colors such as magenta and yellow image-forming members. Alternatively, the thermal image-forming members of the invention may include sections, or "patches" of two or more differently disposed adjacent to each other on the same substrate.

Such thermal imaging members and various combinations thereof are generally well known, and various methods of preparing heat-sensitive recording elements employing these materials also are well known and have been described, for example, in U.S. Pat. Nos. 3,539,375, 4,401,717, 4,415,633 and 4,503,095.

The color thermal imaging compositions of the invention may be used in any suitable thermal imaging members and thermal imaging methods. Many thermal imaging methods, both of the transfer type and the direct type, are known in the art and therefore extensive discussion of such methods is not required. Generally, in thermal transfer imaging methods the thermal imaging member is brought into contact with an image-receiving member and an imagewise pattern of image material is transferred to the image-receiving member in accordance with an imagewise pattern of thermal energy applied to the thermal imaging member by a thermal print head or print heads.

The formulation of ink jet ink compositions of the invention, and the printing apparatus and methods used to carry out ink jet printing, can be effected using techniques which are well known in the art. Thus, the copper phthalocyanine dyes and the dyes of formula I can be formulated into aqueous ink compositions using conventional techniques which are well known to those skilled in the preparation of such ink compositions. For example, the ink composition may contain an alcohol or a glycol as a co-solvent although the present dyes are sufficiently soluble in water such that the use of such co-solvents is not necessary. The ink compositions may contain any suitable additives. Typical additives for such compositions include stabilizers, viscosity modifiers, bactericides, fungicides, etc. Typically, a measured quantity of each ink composition is placed in a separate ink jet cartridge comprising a housing having walls defining a reservoir for the ink and an outlet through which the ink leaves the cartridge and flows to a print head (typically of the thermal or piezoelectric type) which provides a stream of droplets of the ink and directs these droplets to a receiver surface, which typically is a paper sheet.

EXAMPLES

The method of the invention will now be described further with respect to specific preferred embodiments by way of examples, it being understood that these are intended to be illustrative only and the invention is not limited to the materials, amounts, procedures and process parameters, etc. recited therein. All parts and percentages are by weight unless otherwise specified.

Example I

Coatings of a control copper phthalocyanine dye and of imaging compositions according to the invention were formed on a polyethylene terephthalate sheet. The copper phthalocyanine dye was Solvent Blue 70. The dye(s) were dissolved in n-butanol at a concentration of about 3.23% of copper phthalocyanine (Solvent Blue 70) and about 0.77% of aminoanthraquinone dye (Solvent Blue 14), coated on the substrate and dried in air at ambient temperature (~22-24° C.) for about 5 to 10 minutes. The thickness of the dye layers was about 0.5 µm.

The coatings were exposed to 10 ppm ozone for one hour in an ozone generating chamber made up of a pyrex jar and a mercury argon lamp. The ozone was produced in situ by the direct photolysis of oxygen in the ambient air in the chamber. A fan within the chamber ensured that all the coatings were uniformly exposed to the ozone.

A Gretag SPM50 densitometer was used to measure and record the reflection density, calorimetric parameters and spectrum of each coating before and after exposure to ozone. The extent of ozone stabilization due to the aminoanthraquinone dye was quantified by the difference in reflection density and calorimetric parameter, delta E*, calculated from the changes of the individual parameters, i.e., L*, a* and b*, as shown in Table I.

TABLE I

| Aminoanthraquinone Dye | Coating | Cyan density retained | delta E* |
| --- | --- | --- | --- |
| None | Control | 55% | 24.7 |
| Disperse Violet 1 | A-1 | 98% | 13.2 |
| 1-Aminoanthraquinone | A-2 | 94% | 8.5 |
| Disperse Blue 56 | A-3 | 82% | 14.2 |
| Disperse Blue 60 | A-4 | 55% | 18.1 |
| Disperse Blue 14 | A-5 | 86% | 11.8 |
| Solvent Blue 59 | A-6 | 84% | 12.2 |
| Solvent Blue 14 | A-7 | 78% | 16.6 |
| Disperse Blue 7 | A-8 | 64% | 15.1 |
| Disperse Blue 3 | A-9 | 62% | 20.8 |
| Solvent Blue 35 | A-10 | 62% | 21.3 |
| Solvent Blue 104 | A-11 | 70% | 14.8 |
| Solvent Green 28 | A-12 | 61% | 15.8 |
| Solvent Green 3 | A-13 | 57% | 19.0 |

It can be seen from the data shown in Table I that coatings of the compositions according to the invention exhibited improved stabilization to ozone due to the presence of the aminoanthraquinone dyes.

Figure 2A:
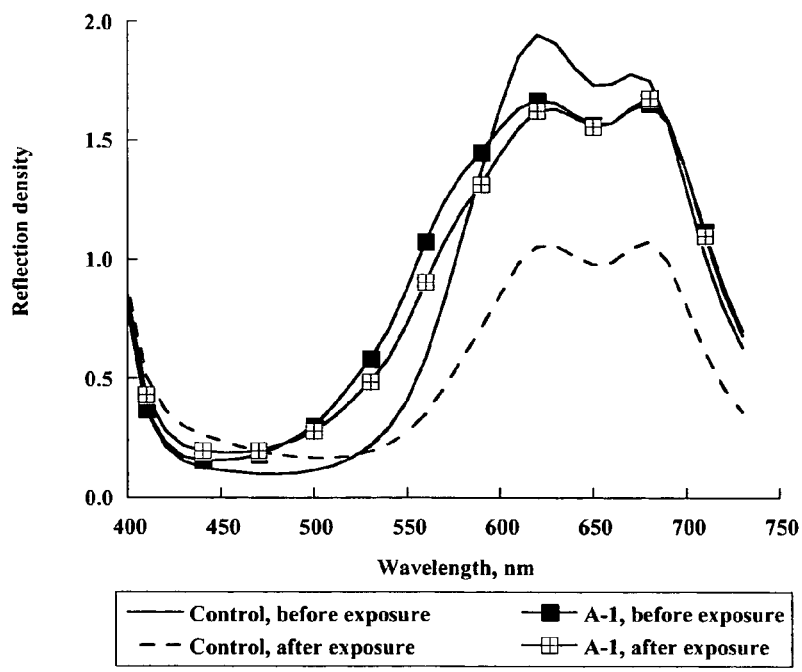
FIGS. 2A and 2B each illustrate the reflection spectra of a control coating and a coating composition of the invention, both before and after exposure to ozone.
Figure 2B:
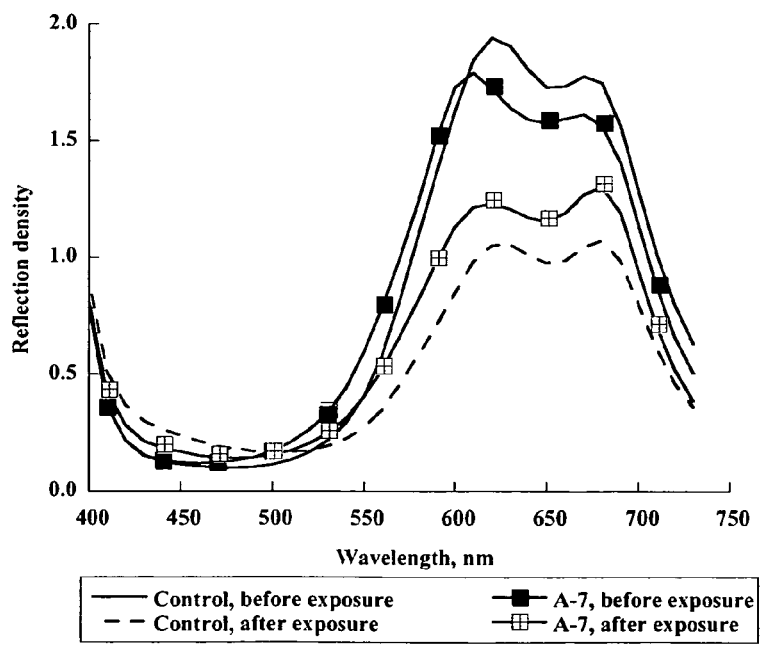

The reflection spectra of the Control and imaging composition A-1 of the invention are shown in FIG. 2A. It can be seen that the Solvent Blue 70 (the control) coating, after exposure, exhibited a significant loss in absorption and spectral shift due to ozone exposure whereas imaging composition A-1 of the invention exhibited much less loss in density. FIG. 2B shows the reflection density of the Control and imaging composition A-7 of the invention before and after exposure to ozone. It can be seen that imaging composition A-7 according to the invention had significantly less loss in absorption due to ozone exposure.

Example II

A control thermal imaging member and a thermal imaging member according to the invention were prepared. Initially a coating composition was prepared containing the dye (2% w/w) and the appropriate amount of a thermal solvent in 1-butanol. The solution was then coated on an approximately 4.5 µm thick poly (ethylene terephthalate) film base which had a slip coating for thermal printing on the opposite side using a #7 Meyer rod. The coating was dried using warm air.

After drying the resulting donor element was placed over a receiver sheet of the type described in U.S. Pat. No. 6,761,788 B2, with the coated side of the donor element in contact with the microporous receiver coating. The resulting assembly was printed using a laboratory test-bed printer equipped with a thermal head supplied by Kyocera Corporation, Kyoto, Japan, as described below.

The control was prepared by forming a solution of about 2% copper phthalocyanine dye (Solvent Blue 70) and 5% of a thermal solvent (p-methoxy dodecylbenzamide) in n-butanol and depositing a layer of the solution on an approximately 4.5 μm thick sheet of poly (ethylene terephthalate). The layer was dried in air to give a dry coating of about 1.1 μm.

A thermal imaging member of the invention was prepared as described above from a solution of 1.6% Solvent Blue 70, 0.33% of an aminoanthraquinone dye of formula I (Disperse Blue 14) and 5% of the p-methoxy dodecylbenzamide thermal solvent.

The thermal imaging members were used in a thermal transfer imaging method as described in U.S. Pat. No. 6,537,410 B2 with the laboratory test bed printer The following printing parameters were used:

Print head width: 4 inches
Resistor size: 70×70 microns
Resistance: 1124 Ohm
Voltage: 11 V
Print speed: 1.67 inches/second (2 msec per line)
Pressure: 1.5-2 lb/linear inch
Donor peeling: 90 degree angle, 0.1-0.2 seconds after printing
Dot pattern: Odd-numbered and even-numbered pixels printed alternately in successive lines; one pixel (70 micron) spacing between lines in paper transport direction.

The images formed with the control and the imaging member of the invention were exposed to ozone and densities before and after exposure were read as described in Example I. The results are shown in Table II. It can be seen that the imaging member of the invention retained more cyan density after exposure to ozone than the control.

TABLE II

|  | Solvent Blue 70 | Solvent Blue 70 + Disperse Blue 14 |
|---|---|---|
| Cyan density Before exposure to ozone | 1.42 | 1.42 |
| Cyan density After exposure to ozone | 0.75 | 0.90 |
| % Density retained | 53% | 63% |

Although the invention has been described in detail with respect to various preferred embodiments, it is not intended to be limited thereto, but rather those skilled in the art will recognize that variations and modifications are possible which are within the spirit of the invention and the scope of the appended claims.

What is claimed is:

1. A thermal transfer imaging member comprising a substrate carrying a solid layer of a thermal image-forming material comprising a copper phthalocyanine dye and an aminoanthraquinone dye represented by the formula

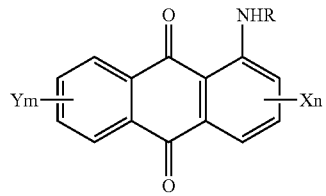

(I)

wherein
R is selected from:
a. hydrogen;
b. alkyl, straight-chain or branched;
c. hydroxyalkyl;
d. aryl; and
e. substituted aryl;
X and Y are each independently selected from:
a. hydrogen;
b. halogen;
c. —OH;
d. —NHR, where R is as previously defined; or
e. X or Y, independently, together with two of the carbon atoms of the ring moiety to which X or Y is attached, represents the carbon, nitrogen or oxygen atoms necessary to form a 5 or 6 member carbocyclic or heterocyclic ring containing one or more carbonyl groups; and
m and n are each independently integers of from 1 to 3.

2. A thermal imaging member as defined in claim 1 wherein said layer of thermal image-forming material includes from about 1 to about 2 molar equivalents of copper phthalocyanine dye to about 1 molar equivalent of aminoanthraquinone dye.

3. A thermal imaging member as defined in claim 1 wherein said copper phthalocyanine dye is selected from Solvent Blue 44, Solvent Blue 67, Solvent Blue 70, and mixtures thereof.

4. A thermal imaging member as defined in claim 1 wherein said aminoanthraquinone dye is selected from Disperse Blue 3, Disperse Blue 7, Disperse Blue 14, Disperse blue 56, Disperse Blue 60, Solvent Blue 14, Solvent Blue 35, Solvent Blue 59, Solvent Blue 104, Solvent Green 3, Solvent Green 28, Disperse Violet 1 and mixtures thereof.

5. A thermal imaging member as defined in claim 1 wherein said layer of thermal image-forming material comprises a dye-containing amorphous phase comprising said copper phthalocyanine dye and said aminoanthraquinone dye, wherein said dyes form a continuous film.

6. A thermal imaging member as defined in claim 5 wherein said layer of thermal image-forming material further includes a thermal solvent, at least a portion of said thermal solvent forming a separate crystalline phase.

7. A thermal imaging member as defined in claim 6 wherein said thermal solvent has a melting point above about 50.degree. C.

8. A thermal imaging member as defined in claim 5 wherein said layer of image-forming material has a thickness not greater than about 1 μm.

9. A thermal transfer imaging method comprising heating a thermal imaging member as defined in claim 1 and imagewise transferring portions of the thermal image-forming material to a receiver member which is in contact with said thermal imaging member.

10. A thermal imaging method as defined in claim 9 wherein said layer of thermal image-forming material includes from about 1 to about 2 molar equivalents of copper phthalocyanine dye to about 1 molar equivalent of aminoanthraquinone dye.

11. A thermal imaging method as defined in claim 9 wherein said copper phthalocyanine dye is selected from Solvent Blue 44, Solvent Blue 67, Solvent Blue 70, and mixtures thereof.

12. A thermal imaging method as defined in claim 9 wherein said aminoanthraquinone dye is selected from Disperse Blue 3, Disperse Blue 7, Disperse Blue 14, Disperse blue 56, Disperse Blue 60, Solvent Blue 14, Solvent Blue 35, Solvent Blue 59, Solvent Blue 104, Solvent Green 3, Solvent Green 28, Disperse Violet 1 and mixtures thereof.

13. A thermal imaging method as defined in claim 9 wherein said layer of thermal image-forming material comprises a dye-containing amorphous phase comprising said copper phthalocyanine dye and said aminoanthraquinone dye, wherein said dyes form a continuous film.

14. A thermal imaging method as defined in claim 13 wherein said layer of thermal image-forming material further includes a thermal solvent, at least a portion of said thermal solvent forming a separate crystalline phase.

15. A thermal imaging method as defined in claim 13 wherein said thermal solvent has a melting point above about 50.degree. C.

16. A thermal imaging method as defined in claim 13 wherein said layer of image-forming material has a thickness not greater than about 1 .mu.m.

* * * * *

UNITED STATES PATENT AND TRADEMARK OFFICE
CERTIFICATE OF CORRECTION

PATENT NO. : 7,432,224 B2  Page 1 of 1
APPLICATION NO. : 10/932202
DATED : October 7, 2008
INVENTOR(S) : Fariza B. Hasan It is certified that error appears in the above-identified patent and that said Letters Patent is hereby corrected as shown below:

Column 14,
Line 6, delete "1 .mu.m." and insert -- 1 μm. --.

Signed and Sealed this

Eighteenth Day of August, 2009

David J. Kappos
*Director of the United States Patent and Trademark Office*